United States Patent [19]
Georgoulis

[11] Patent Number: 6,062,716
[45] Date of Patent: May 16, 2000

[54] FRONT-END DISCHARGE CONCRETE MIXER TRUCK

[75] Inventor: Stratton J. Georgoulis, Dallas, Tex.

[73] Assignee: TIC United Corp., Dallas, Tex.

[21] Appl. No.: 09/193,048

[22] Filed: Nov. 16, 1998

Related U.S. Application Data

[60] Provisional application No. 60/066,355, Nov. 21, 1997.

[51] Int. Cl.[7] .................................. B28C 5/20; B28C 5/42
[52] U.S. Cl. .................................................. 366/54; 366/62
[58] Field of Search .................................... 366/53–60, 62, 366/63, 220, 225, 227

[56] References Cited

U.S. PATENT DOCUMENTS

| | | |
|---|---|---|
| D. 249,665 | 9/1978 | Silbernagel . |
| D. 271,875 | 12/1983 | Silbernagel . |
| D. 291,547 | 8/1987 | Silbernagel . |
| 2,859,949 | 11/1958 | Willard . |
| 3,019,002 | 1/1962 | Prichard . |
| 3,038,704 | 6/1962 | Cook . |
| 3,246,884 | 4/1966 | Prichard et al. . |
| 3,334,872 | 8/1967 | Hansen et al. . |
| 3,603,565 | 9/1969 | Johnson . |
| 3,633,879 | 1/1972 | Prichard . |
| 3,929,321 | 12/1975 | Sims . |
| 3,930,567 | 1/1976 | Sims . |
| 4,009,868 | 3/1977 | Blind . |
| 4,047,604 | 9/1977 | Daoust et al. . |
| 4,212,542 | 7/1980 | Beekenkamp ............................. 366/54 |
| 4,311,396 | 1/1982 | Brandi ...................................... 366/51 |
| 5,018,593 | 5/1991 | Hermann . |
| 5,192,178 | 3/1993 | Sibernagel . |
| 5,348,387 | 9/1994 | Gordon et al. ........................... 366/63 |
| 5,884,998 | 3/1999 | Silbernagel .............................. 366/59 |

FOREIGN PATENT DOCUMENTS

| | | | |
|---|---|---|---|
| 1066267 | 11/1979 | Canada ................................... 366/59 |
| 2311323 | 9/1973 | Germany ................................ 366/62 |

Primary Examiner—Charles E. Cooley
Attorney, Agent, or Firm—Stephen T. Belsheim

[57] ABSTRACT

A front-end discharge concrete mixer truck which includes a truck chassis with frame rails wherein the frame rails are spaced apart a distance greater than 34 inches. The truck chassis having a front end and a rear end. An engine is mounted to the truck chassis midway between the front end and the rear end thereof. A mixer assembly is attached to the chassis. The mixer assembly has a rotatable barrel and an outlet chute. The mixer barrel is driven by the engine. The outlet chute is movable so as to discharge concrete at the front end of the chassis.

9 Claims, 3 Drawing Sheets

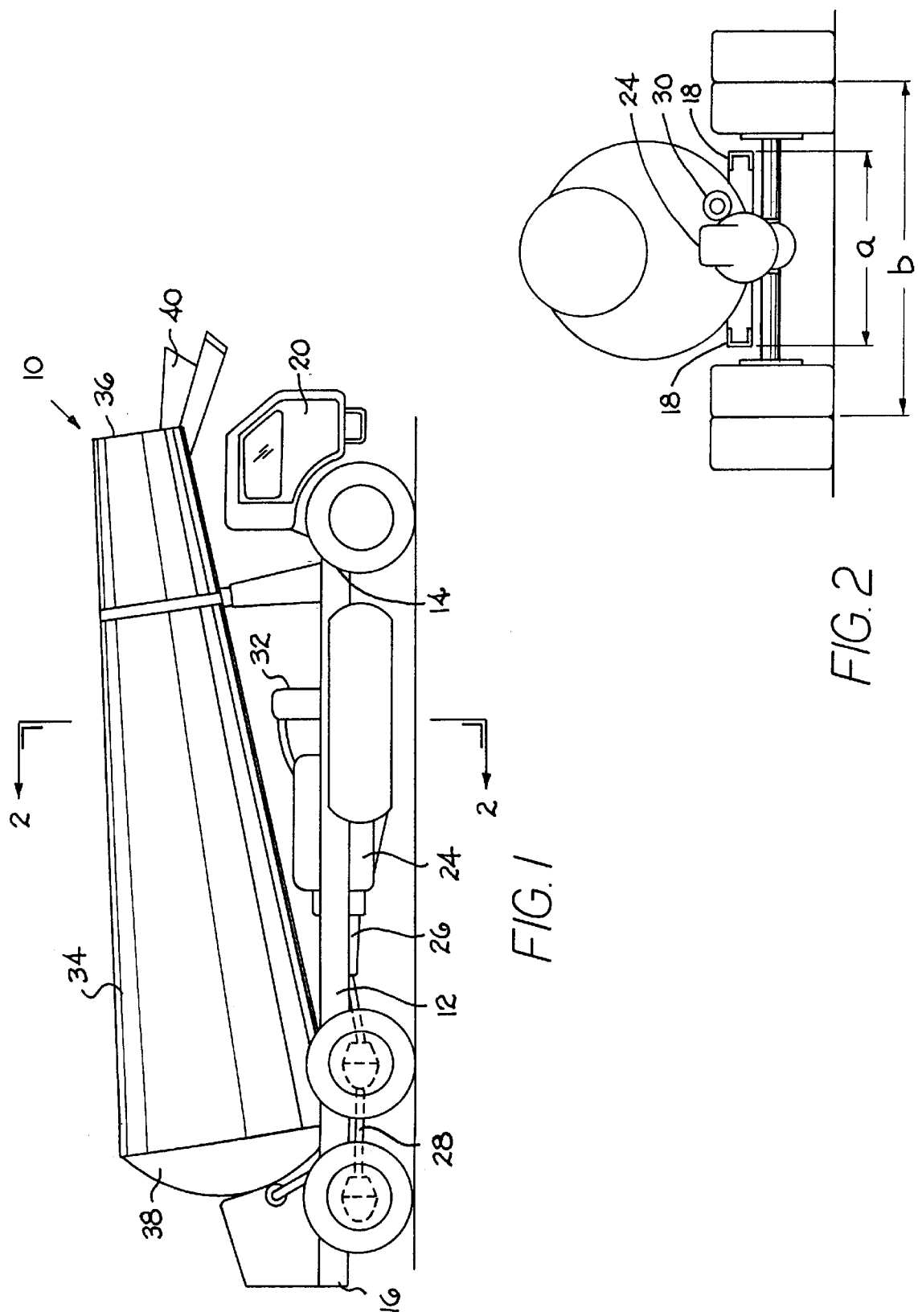

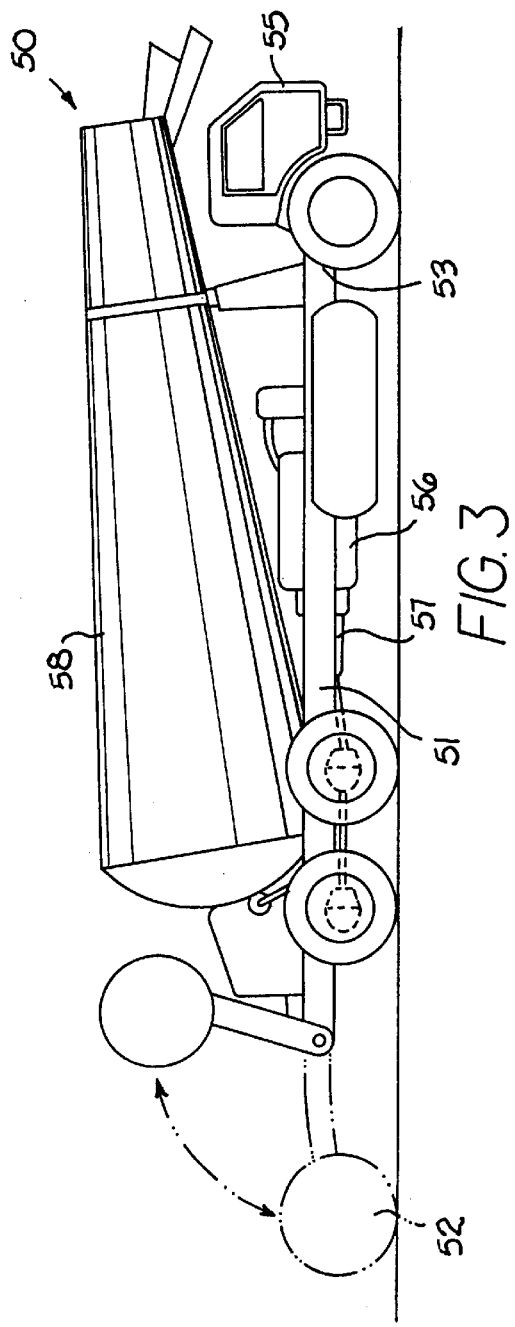
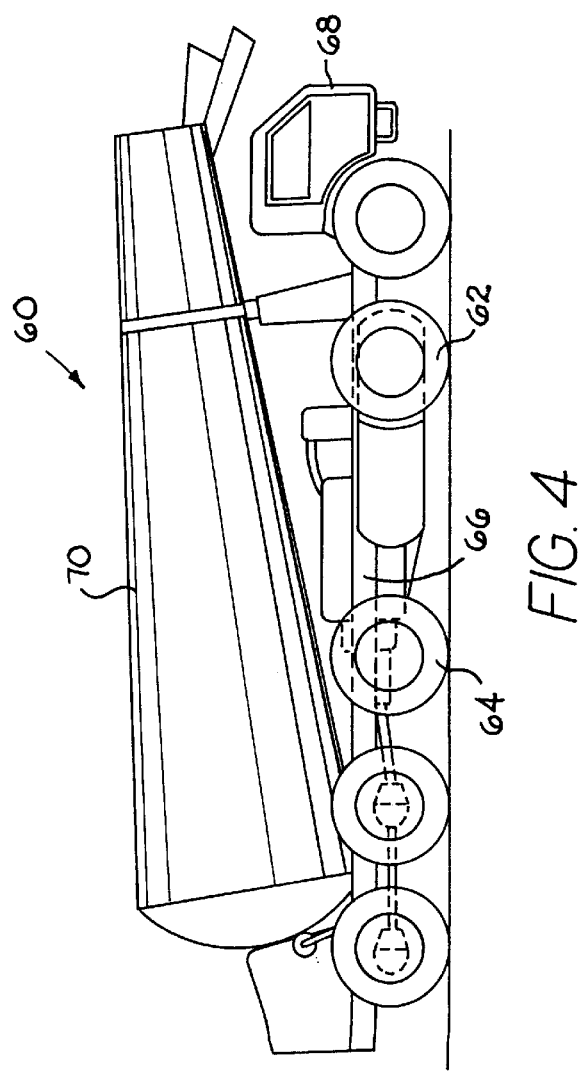

FRONT-END DISCHARGE CONCRETE MIXER TRUCK

CROSS-REFERENCE TO PROVISIONAL PATENT APPLICATION

This non-provisional patent application claims the benefit of provisional patent application Ser. No. 60/066,355 filed on Nov. 21, 1997 for a FRONT-END DISCHARGE CONCRETE MIXER TRUCK.

BACKGROUND OF THE INVENTION

The invention pertains to a concrete mixer truck. More specifically, the invention pertains to a concrete mixer truck that uses a mixer barrel with a front-end discharge.

Typically, there are two basic styles of concrete mixer trucks. One style of concrete truck has a mixer barrel that discharges the concrete at the rear end thereof. This is a rear-end discharge style of concrete mixer truck. Another style of concrete mixer truck uses a mixer barrel that discharges concrete at the front end thereof. This type of truck is a front-end discharge style of concrete mixer truck. In this regard, U.S. Pat. No. 4,009,868 to Blind discloses a front-end discharge transit concrete mixer and U.S. Pat. No. 5,192,178 to Silbernagel discloses a front end discharge concrete mixer wherein these two patents are hereby incorporated by reference herein.

Current front-end discharge concrete mixer trucks utilize an engine located at the rear of the truck. The presence of the engine at the rear of the truck has a number of drawbacks. These drawbacks are set forth below.

The typical separation of the frame rails on current front-end discharge concrete mixer trucks is about thirty-four inches. Such a narrow separation presents several drawbacks. U.S. Pat. No. 3,603,565 to Johnson discloses a support frame for a concrete mixer truck wherein such patent is hereby incorporated by reference herein.

One drawback with a thirty-four inch frame rail separation, the industry standard separation, is that the engine can be lowered only so far due to interference and clearance of the engine protrusions and accessories (e.g., gear drives, turbo chargers, alternators, starters, filters, exhaust tubing, and the like) thereof. Many manufacturers remove portions of the frame rail flanges to provide additional clearance for installation and maintenance of engine components. The design compromise that removes portions of the frame rail flanges reduces the strength of the frame rail assembly. In addition, the height of the frame rail webs are somewhat design restricted, even though the height of the frame rail web is the most effective way to increase the frame rail strength. The consequence of this is that the concrete mixer truck design is compromised and weakened and incurs higher maintenance costs as it utilizes standard frame rail separation. It is seen that by providing a frame rail separation wider than the industry standard of thirty-four inches, the engine and its accessories can fit between the frame rails so as to be lower than in current concrete mixer trucks so as to provide for a lower center of gravity without compromising the strength of the frame rail assembly.

By providing a wider frame rail separation, and hence, a lower engine mounting, there is an improvement in the accessibility to the engine for service. By providing a wider frame rail separation, there is more space for the mixer barrel and for laterally positioning the cab. It is thus desirable to provide a front-end discharge concrete truck that has a wider frame rail separation.

One drawback pertains to the weight distribution on the chassis of the truck. More specifically, the presence of the engine and its associated structure at the rear of the chassis places a great amount of weight toward the rear of the chassis. It would be desirable to provide a front-end discharge style of concrete mixer truck that has an improved weight distribution on the chassis so that less weight is on the rear of the chassis, and more evenly distributed along the length of the chassis.

Another drawback with the current rear engine front-end discharge concrete mixer truck is that a so-called "around the corner" drive train is necessary to accommodate the rear engine truck. Such a drive train is more expensive than a conventional drive train. Such a drive train is also more complex, and more expensive, to service than a conventional drive train. It would therefore be highly desirable to provide a front-end discharge concrete mixer that does not need an "around the corner" drive train, but can instead, use a conventional type of drive train.

Still another drawback with the present rear engine front-end discharge concrete mixer trucks is the presence of a chassis that has an extended length. The extended length of the chassis is necessary to accommodate the rear engine. Because of the extended length of the chassis, there is a restriction on the maneuverability of the truck at the job site. The extended length of the chassis to accommodate the rear engine also prevents the use of simple and more conventional styles of tag wheel-axle arrangements. U.S. Pat. No. 5,018,593 to Hermann discloses a high lift tag axle for a concrete truck wherein such patent is hereby incorporated by reference herein. Furthermore, the extended length of the chassis requires the use of longer, and less conventional, hydraulic systems for the rearward PTO. It would be desirable to provide a front-end discharge style of concrete mixer truck that does not require an extended chassis.

Still another drawback with rear engine concrete trucks is that an unconventional cooling system is necessary so that the radiator has adequate ventilation thereby providing adequate cooling capacity. Such an unconventional cooling system is expensive. It would be highly desirable to provide a front-end discharge style of concrete mixer truck that uses a conventional cooling system for the engine.

SUMMARY OF THE INVENTION

It is an object of the invention to provide an improved front-end discharge concrete mixer truck.

It is another object of the invention to provide an improved front-end discharge concrete mixer truck that has a wider frame rail separation that provides for a lower engine mounting.

It is another object of the invention to provide an improved front-end discharge concrete mixer truck that has a wider frame rail separation that provides for more space to accommodate the mixer barrel and for laterally positioning the cab.

It is another object of the invention to provide an improved front-end discharge concrete mixer truck that has improved, more efficient, weight distribution with less of the rear chassis weight required for support of the engine.

It is another object of the invention to provide an improved front-end discharge concrete mixer truck that does not need an "around the corner" drive train.

It is another object of the invention to provide an improved front-end discharge concrete mixer truck that does not use an extended length chassis.

It is another object of the invention to provide an improved front-end discharge concrete mixer truck that can use a more conventional cooling system.

In one form thereof the invention is a front-end discharge concrete mixer truck which includes a truck chassis with frame rails wherein the frame rails are spaced apart a distance greater than 34 inches and up to the maximum legal chassis width. The truck chassis having a front end and a rear end. An engine is mounted to the truck chassis midway between the front end and the rear end thereof. A mixer assembly is attached to the chassis. The mixer assembly has a rotatable barrel and an outlet chute. The mixer barrel is driven by the engine. The outlet chute is movable so as to discharge concrete at the front end of the chassis.

BRIEF DESCRIPTION OF THE DRAWINGS

The following is a brief description of the drawings that form a part of this patent application:

FIG. 1 is a side view of a specific embodiment of the front-end discharge concrete truck of the present invention;

FIG. 2 is a cross-sectional view of the specific embodiment of FIG. 1 taken along section line 2—2;

FIG. 3 is a side view of another specific embodiment of the front-end discharge concrete mixer truck of the invention that employs a rear tag wheel-axle assembly;

FIG. 4 is a side view of another specific embodiment of the front-end discharge concrete mixer that employs two mid-frame tag wheel-axle assemblies.

DETAILED DESCRIPTION OF SPECIFIC EMBODIMENTS

Figure 5:
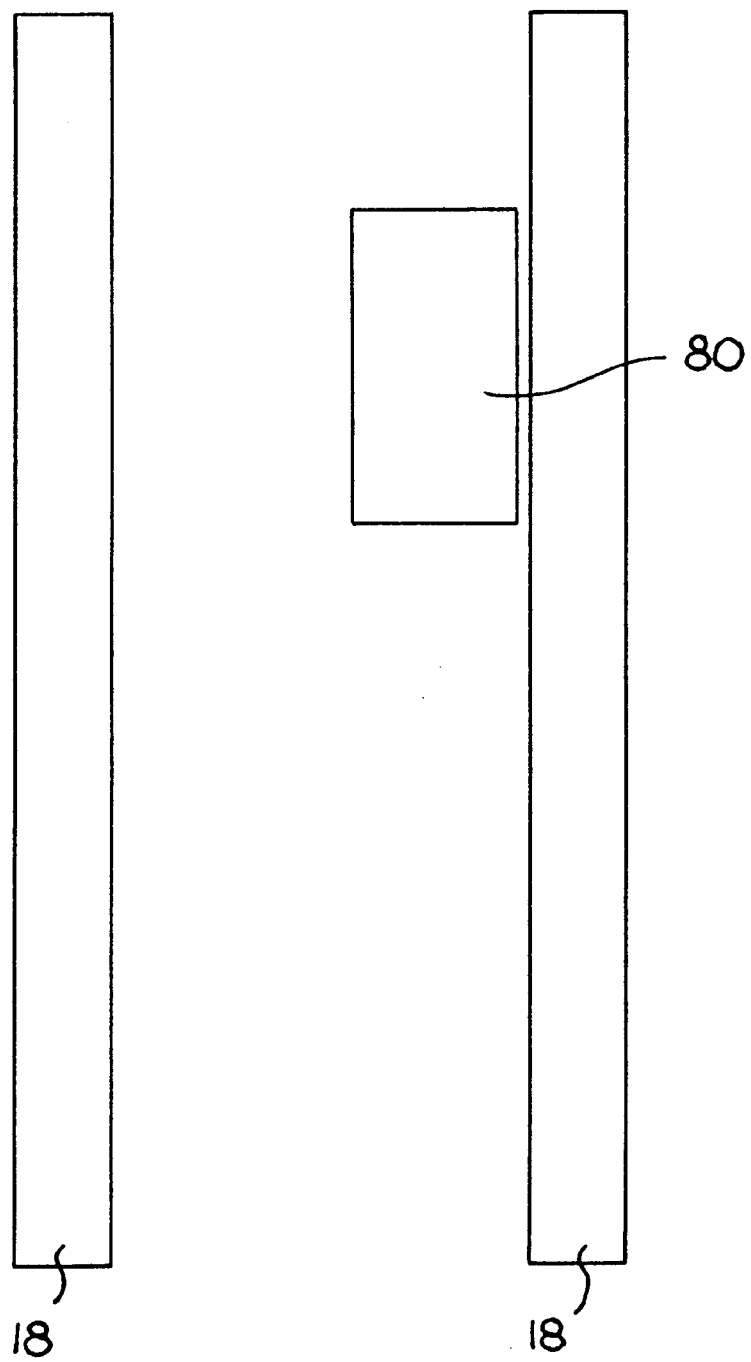
FIG. 5 is a mechanical schematic showing the placement of the fuel tank so that the fuel tank is mounted inboard of the frame rails.

Referring to the drawings, FIG. 1 illustrates one specific embodiment front-end discharge concrete mixer truck of the invention, generally designated as 10. Concrete truck 10 has an elongate chassis 12 having a front end 14 and a rear end 16. The chassis 12 includes a pair of spaced-apart frame rails 18. The frame rails 18 are spaced apart a distance "a" of 42 inches.

A one-man cab 20 mounts to the chassis 12 at the front end 14 thereof. Because of the fact that the spacing between the rails is 42 inches, the one-man cab 20 can be laterally centered on the chassis. In the alternative, the one-man cab can be side mounted to the chassis.

The concrete mixer truck 10 includes a conventional drive train. The drive train includes an engine 24, a transmission 26, and a rear-drive tandem assembly 28. The drive train is also of a conventional length. The engine 24 includes an exhaust 30.

The concrete mixer truck 10 further includes a radiator 32 which is forward of the engine 24. The radiator operatively connects to the engine so as to cool the same during operation. The radiator 32 is positioned on the chassis 12 so that it receives a very adequate air flow during the movement of the truck.

The concrete mixer truck 10 further includes a mixer barrel 34 which has a forward end 36 and a rearward end 38. The water and concrete mix is introduced into the mixer barrel in a conventional fashion. The mixer barrel has an outlet which opens into a chute 40. The concrete exits the mixer barrel 34 via the outlet and the chute 40. In operation, the engine powers the rotation of the mixer barrel.

Referring to FIG. 2, one sees that the spacing between the frame rails of 42 inches permits the engine and the entire drive train to be positioned lower in the chassis. By lowering the engine and the entire drive train, the concrete mixer truck has a lower center of gravity. By lowering the engine and the drive train, there is provided better and easier access to the engine and drive train for servicing.

It should be pointed out that there is a limit to the distance of the frame rail separation because of the legal width limits for a concrete mixer truck. In other words, the frame rails may not be separated such a distance that the overall width of the truck is over the legal width limit. In this regard, FIG. 2 shows a distance "b" that equals the legal width limit.

Referring to FIG. 3, there is shown another embodiment of the concrete truck of the invention, generally designated as 50. The basic design of truck 50 is the same as truck 10, except for the use of a rear tag wheel-axle assembly 52. More specifically, the truck 50 includes a chassis 51 which has a front end 53 and a read end 54. A one man cab 55 mounts to the chassis 51 at the front end 53 thereof. The concrete mixer truck 50 further includes a drive train which includes an engine 56 and a transmission 57. The truck 50 also includes a mixer barrel 58. In this regard, one sees that the wheel-axle tag assembly 52 is shown in a retracted position by the solid lines and in an extended, operative, position by the dashed lines. Because of the fact that the engine and drive train is mounted intermediate the front and rear ends of the chassis, the wheel-axle tag assembly easily mounts to the rear of the chassis and operates without any interference from the engine or the drive train.

FIG. 4 shows another embodiment of the concrete mixer truck 60 wherein there are two mid-frame tag wheel-axle tag assemblies 62 and 64. The basic design of the truck 60 is like that of truck 10. More specifically, truck 60 includes a chassis 66 which has a cab 68 mounted at the front end thereof. The truck 60 also includes a mixer barrel 70.

It becomes apparent that the present invention provides an improved front-end discharge concrete mixer truck with a number of distinct advantages over the earlier front-end discharge concrete mixer trucks. These advantages include the use of an engine mounted mediate between the front and rear ends of the chassis.

By mounting the engine mid-way between the front and rear ends, there is achieved an improved weight distribution on the chassis so that less weight is on the rear of the chassis. Furthermore, the use of an engine mounted mediate of the front and rear end uses a conventional drive train so as to not need an "around the corner" drive train.

The use of a mid-chassis mounted engine also eliminates the need for an extended length chassis. This results in better maneuverability of the truck at the job site. The elimination of an extended length chassis also permits the use of some conventional styles of tag wheel-axle arrangements. Furthermore, by not needing an extended length chassis, there is no requirement of longer, and less conventional, hydraulic systems for the rearward PTO. By mounting the engine mid-way between the front and rear ends of the chassis, a conventional cooling system can be utilized without the need for an expensive unconventional system.

By widening the separation between the frame rails on front-end discharge concrete mixer trucks, the engine can be lower than in current trucks so as to provide for a lower center of gravity. By providing a wider frame rail separation, and hence, a lower engine mounting, there is an improvement in the accessibility to the engine for service. By providing a wider frame rail separation, there is more space for the mixer barrel and for centering the cab.

Wide width frame rail spacing of greater than 34 inches up to the maximum legal width of the chassis (which is currently 102 inches under Federal law) provides for the ability to place fuel tanks (as an option) inboard of the frame rails. This fuel tank placement provides additional crash protection from side impact collisions. The frame rail and other frame-mounted assemblies will help absorb side impact energy in the event of a collision. These features will decrease the likelihood of a fuel spill in the event of a side impact collision. Referring to FIG. 5, there is a mechanical schematic drawing showing the inboard location of the fuel tank. In this regard, the fuel tank 80 is located between, or inboard, of the frame rails 18.

By providing a wider frame rail separation the steps to the cab can be safer and more ergonomic entry steps to the cab since they will be mounted away from the fuel tank filler neck. Fuel that is inadvertently spilled on the steps during fueling can lead to the potential for injury if one steps on the steps covered with fuel. By moving the steps away from the filler neck, there is a decrease in the chance that split fuel will be on the steps.

Battery box mounting can be optimized to provide less vibration and shorter battery cable lengths by using a wider frame rail separation. In a conventional chassis, the battery box is typically cantilevered outboard of the frame rails. The battery cable length increases occurs due to the outboard mounting wherein the increase in length adds resistance to the electrical amperage to start the engine. The combination of the wider frame rail separation and the mid-chassis engine mounting will provide for shorter battery cables and less resistance to starting. The mounting of the battery box can be improved to decrease the vibration incurred by the battery by mounting the battery box between the frame rails so that it is supported by both sides of the frame rail.

The wider frame rail separation also provides for the more efficient mounting of other truck equipment such as air tanks, hydraulic lines and exhaust tubing.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed:

1. A front-end discharge concrete mixer truck comprising:
    a truck chassis with frame rails wherein the frame rails are spaced apart a distance greater than 34 inches;
    the truck chassis having a front end and a rear end;
    an engine mounted to the truck chassis midway between the front end and the rear end thereof;
    a mixer assembly attached to the chassis, the mixer assembly having a rotatable barrel and an outlet chute, and the mixer barrel being driven by the engine; and
    the outlet chute being movable so as to discharge concrete at the front end of the chassis.

2. The concrete truck of claim 1 wherein a fuel tank is mounted to the chassis so as to be between the frame rails.

3. The concrete truck of claim 1 wherein a one man cab is mounted to the chassis adjacent to the front end thereof.

4. The concrete truck of claim 3 wherein the cab is between the frame rails.

5. The concrete truck of claim 1 further including a rear tag wheel assembly mounted to the chassis adjacent to the rear end thereof.

6. The concrete truck of claim 1 further including a mid-frame tag wheel assembly mounted to the chassis mid way between the front end and the rear end of the chassis.

7. The concrete truck of claim 1 further including a radiator mounted to the chassis forwardly of the engine.

8. A front-end discharge concrete mixer truck comprising:
    a truck chassis with frame rails wherein the frame rails are spaced apart a distance greater than thirty-four inches;
    the truck chassis having a front end and a rear end;
    an engine mounted to the truck chassis midway between the front end and the rear end thereof;
    a mixer assembly attached to the chassis, the mixer assembly having a rotatable barrel and an outlet chute, and the mixer barrel being driven by the engine;
    the outlet chute being movable so as to discharge concrete at the front end of the chassis; and
    a fuel tank is mounted to the chassis so as to be between the frame rails.

9. The concrete truck of claim 8 wherein a one man cab is mounted to the chassis adjacent to the front end thereof, and the cab being midway between the frame rails.

* * * * *